United States Patent [19]
Wiggins et al.
[11] 3,787,810
[45] Jan. 22, 1974

[54] TEST METHOD FOR A PROGRAMMABLE DATA COMMUNICATION TERMINAL

[75] Inventors: Gerald N. Wiggins, Pinckney; Jerome S. Rogers, Livonia, both of Mich.

[73] Assignee: Burroughs Corporation, Detroit, Mich.

[22] Filed: Nov. 2, 1972

[21] Appl. No.: 303,129

[52] U.S. Cl. .... 340/146.1 E, 179/175, 179/175.2 R, 179/175.2 C, 235/153 AC, 324/73 R
[51] Int. Cl. ...................... G08c 25/00, G05b 23/02
[58] Field of Search ............. 178/69 R, 69 G, 69 L; 179/15 AE, 15 BF, 175, 175.2 R, 175.2 C; 324/73 R; 340/146.1 E; 235/153 AC

[56] References Cited
UNITED STATES PATENTS
3,622,877 11/1971 MacDavid et al........ 340/146.1 E X

*Primary Examiner*—Malcolm A. Morrison
*Assistant Examiner*—R. Stephen Dildine, Jr.
*Attorney, Agent, or Firm*—Edwin W. Uren; Edward G. Fiorito; Paul W. Fish

[57] ABSTRACT

A method of testing the transmit and receive functions of a programmable data communications terminal. The transmit function is tested by having a program within the terminal computer continually transmit a known bit pattern and measuring the voltage output of the transmit line. The receive function is tested by connecting the request to send line to the receive data line and programmably generating a character on the request to send line that may be read via the receive data line.

11 Claims, 6 Drawing Figures

TEST METHOD FOR A PROGRAMMABLE DATA COMMUNICATION TERMINAL

BACKGROUND OF THE INVENTION

There are a large number of programmable data communication terminals in public use throughout the United States and foreign countries and a growing need for an economic method of testing these terminals at their locations has developed. One of the most important of these tests is the determination as to whether the data communication circuitry of these terminals is functioning correctly. In order to facilitate these tests it is desirable to place the terminal in a stand alone situation so as to isolate it from any possible faults in other parts of the data communications system such as the data sets or the transmission lines.

In a fully duplexed terminal, which is capable of both transmitting and receiving at the same time, all that is required to test the data communication facility is to connect the transmit data line line to the receive data line and to simply compare the transmitted character with the received characters. However, in the half duplexed data communication terminal, the type of equipment for which the test method disclosed in this application was developed, the terminal is capable of only sending or receiving data at any one time. The previous method of testing these half duplexed data communication terminals involved the use of specialized test equipment. Typically, this test equipment was comprised of sufficient circuitry to receive one or two data characters from the terminal and, upon command, to transmit the same data characters back to the terminal. There are, however, a number of disadvantages to using this method including: the high cost of the test equipment, the fact that different models of terminals often require different types of test equipment, and the fact that the test equipment is inconvenient for a field engineer to carry from site to site. It was primarily with these difficulties in mind that the method disclosed herein was developed.

SUMMARY OF THE INVENTION

It is accordingly an object of the present invention to provide a method that minimizes the requirement for test equipment while fully testing the data communication facilities of a half duplexed programmable data communication terminal.

It is a further object of the invention to provide a method of testing a data communication terminal that requires a minimum of skill on the part of the person performing the test.

It is an additional object of the invention to provide a method to test a wide variety of data communication terminals without specialized equipment.

The first step in testing the data communication terminal is to determine whether the transmit circuitry is functioning correctly. This is accomplished by transmitting a continuous series of characters of a known bit pattern and measuring the output of the data line with a voltmeter. In this manner a missing or added bit may be detected by measuring the output voltage of the transmit line.

The second step in the method is to determine whether the receive circuitry is functioning correctly. This is accomplished by first connecting the request to send line to the receive data line of the terminal computer. Then a direct current voltage source is applied to the carrier detect line in order to simulate a reception of a carrier signal. At this point the terminal computer is placed in the receive mode and a data character is generated on the request to send line by programmatically setting and resetting the flip flop that controls the voltage on the request to send line. This setting and resetting of the request to send line will of course conform with the bit rate that the terminal is set to receive. Therefore, by controlling the time that the request to send line is set and reset, any data pattern can be generated for any desired bit rate.

In this manner a terminal computer with data communication capability may have that data communication capability tested with the only hardware requirement being a voltmeter and a direct current voltage source.

BRIEF DESCRIPTION OF THE DRAWINGS

In order to provide for complete understanding of the invention the following detailed explanation thereof is accompanied by the drawings, in which.

DETAILED DESCRIPTION OF THE INVENTION

The inventive method herein described relates to a large class of terminal computers having data communication capability. Representative of this class is the Burroughs TC500 as described in the Burroughs Publication, *L/TC Reference Manual*, Form No. 1053386. For purposes of illustration, the discussion of the inventive method will center around the Burroughs TC500, as an example of the type of machines to which the inventive method can be applied. It should be understood, however, that the disclosed method may be applied with equal facility to each member of the general class of terminal computers with data communication capabilities.

Figure 1:
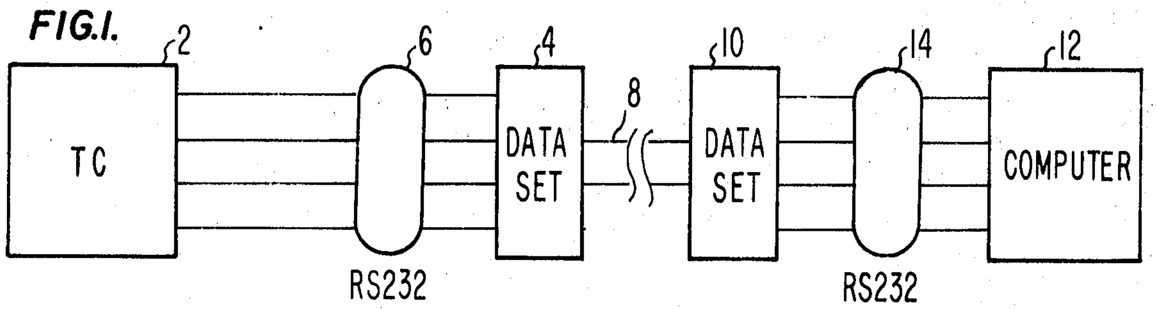
FIG. 1 illustrates in block form a data communications network.

An example of a typical data communication system is shown in FIG. 1, wherein a terminal computer 2 is connected to a data set 4 through a standard interface 6, such as the RS232 the specifications for which have been set forth by the Electronic Industries Association. The data set 4 is then connected over transmission lines to anoter data set 10 which in turn serves as input to a computer 12 through a standard RS232 interface 14. In this manner a central computer 12 may be tied into a large number of terminals in a data communications network.

Figures 2, 5:
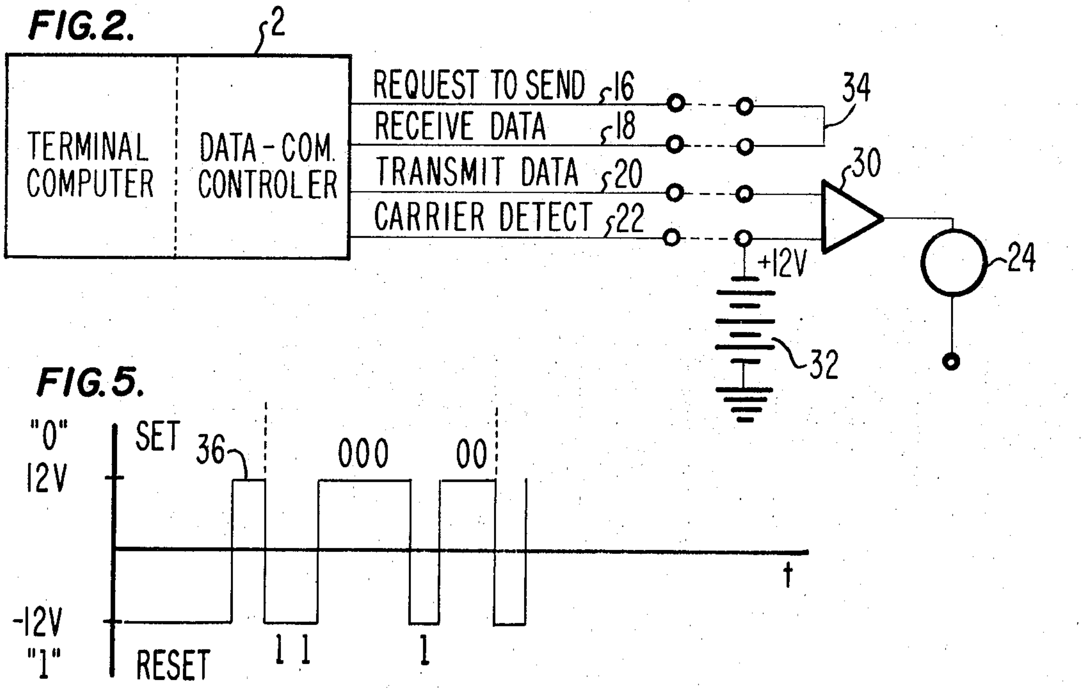
FIG. 2 illustrates the input-output connections of a terminal computer.
FIG. 5 is a voltage graph of an internally generated data character.

In FIG. 2, illustrated in more detail, is the terminal computer 2 shown in FIG. 1 along with selected input-output lines that serve to connect the terminal computer to the RS232 interface 6. These lines include the Request To Send Line 16 the primary function of which is to signal the data set 4 that the terminal computer is prepared to transmit data. The Receive Data Line 18 is the medium by which the terminal computer 2 receives data from the data communications network. Also shown is the Transmit Data Line 20 over which the terminal computer transmits data to the network, and the Carrier Detect Line 22 which indicates to the terminal computer that the data set 4 of FIG. 1 is about to transmit information to the terminal computer. It is these four input-output lines 16, 18, 20 and 22 that are used in the disclosed test method.

There are two primary objectives of the tests illustrated herein; the first is to test the data transmitting function of the terminal computer 2 and the second is to test the ability of the terminal computer to receive data. Although as a practical matter these tests may be performed in any order, for purposes of clarity, the test of the transmit function of the terminal computer will be discussed first.

Figure 3:
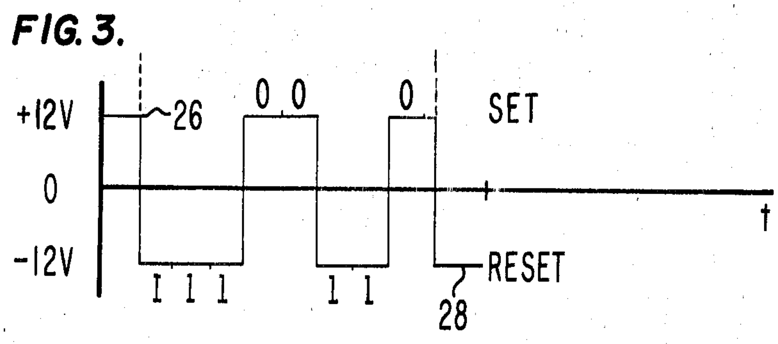
FIG. 3 is a voltage graph of a data character bit pattern.
Figure 4:
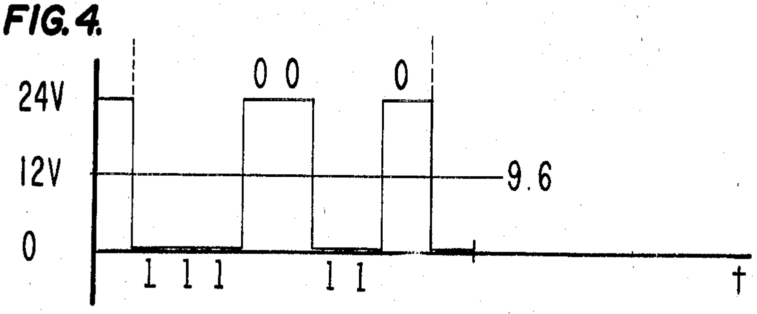
FIG. 4 is a voltage graph of a biased data character bit pattern.

The first step in the process of testing the transmit function of the terminal computer is to program the terminal computer to transmit repetitively a character with a known bit pattern. It should be mentioned at this point that during the test procedures the terminal computer will of course be disconnected from the data communications network, and more specifically, from the RS232 interface as shown at 6 of FIG. 1. Once the terminal computer is transmitting a character of a fixed bit pattern over the transmit data line 20, a voltage measuring device such as a voltmeter 24 will be attached to the Transmit Data Line 20. An example of a typical bit pattern that would be transmitted over the Transmit Data Line 20 of FIG. 2 is illustrated in FIG. 3. In the example shown in FIG. 3, the transmitted character has the bit pattern 1110 0110 where the 0's are represented by a positive 12 volts and the 1's are represented by a negative 12 volts. Under EIA standards, plus or minus 12 volts is the line voltage used with the RS232 interface. In addition to the eight bit data character, the terminal computer will be transmitting a start character bit 26 and an end character bit 28. The start bit 26 is represented by +12 volts and the stop bit 28 is represented by a −12 volts on the Transmit Data Line 20 of FIG. 2. In order to facilitate the reading of the average voltage put out across the Transmit Data Line 20, a voltage summing device 30 is inserted into the Transmit Data Line 20 between the terminal computer 2 and the voltage reading device 24. At this point a direct current voltage of 12 volts is added into the amplifier 30 from the voltage source 32, thereby biasing the transmit data signal as shown in FIG. 3 upwards by 12 volts. As a result of this biased voltage the bit pattern in FIG. 3 will appear as illustrated in FIG. 4. Taking as an example the upwardly biased bit pattern illustrated in FIG. 4, the average voltage on the transmit data line 20 for the character being transmitted, including the start 26 and the stop 28 bits, will be 9.6 bolts. The average voltage is calculated by multiplying the number of 0 bits in the character by 24 volts and dividing by the number of bits in the character, which in this case happens to be 10 bits. This value would then be the approximate reading on the voltmeter 24 for that particular bit pattern when that particular character is continuously transmitted. Thus if one bit is dropped or added to the character as it is being transmitted, the voltmeter 24 will give a reading varying sufficiently from 9.6 to indicate an error in transmission. In this manner the transmit data signal 20 may be checked for the correct number of on and off bits.

The second phase of testing the data communication facilities of a terminal computer involves testing the terminals ability to receive data. Since this test is being carried on in an off line, stand alone environment, the first step is to provide the terminal with the carrier detect signal on line 22 of FIG. 2. This is done in order to simulate the condition where the data set 4 as shown in FIG. 1 is ready to transmit data to the terminal computer 2 and is accomplished by simply attaching a 12 volt voltage source 32 of FIG. 2 to the Carrier Detect Line 22. After thus providing for simulation of the carrier detect signal, the next step is to connect the request to send line 16 with the receive data line 18. This is indicated by the jumper cable 34 in FIG. 2. Due to the fact that the request to send signal that is transmitted over line 16, and the receive data signal transferred over line 18 are a part of a standard interface, RS232, as shown at 6 of FIG. 1, the voltages appearing on each line will be compatible. Therefore, the two signals may be jumped for testing without harm to the circuits. Further, since the RS232 interface 6 is an industry standard, the receive logic of a large class of programmable data communication terminals may be tested off line by using the request to send signal to simulate the data center.

After placing the terminal computer in a receive mode, a signal is generated on the Request To Send Line that serves to simulate a typical character that would come from a data center via a data set. This signal is generated by setting and resetting the request to send line in order to simulate a bit pattern that represents the desired character. An example of how voltage on the Request To Send Line 16 would be set and reset is shown in FIG. 5. When the Request To Send Line 16 is in a reset status, with a −12 volts on the line, a 1 bit is represented, and similarly, when the Request To Send Line is in a set status, with a +12 volts on the line, a 0 bit is represented. By the same token a start bit is simulated by placing the Request To Send Line in a set status (+12 volts) and the stop bit is simulated by the reset condition of the request to send line (−12 volts). As a specific example, the character 1100 0100 illustrated in FIG. 5 would be generated by first setting the Request To Send Line 16 to a positive 12 volts to indicate a start bit 36. Assuming for the sake of illustration that the terminal computer is prepared to receive data at the rate of 600 bits per second, the request to send line would programmably be set for a period of approximately 0.166 milliseconds to simulate the start bit. The Request To Send Line then would be reset to a value of −12 volts for a period of approximately 0.332 milliseconds to simulate the transmission of the two 1 bits. In this way the remaining bits of the character would be generated by alternately setting and resetting voltage on the Request To Send Line for measured periods of time. Then, if the character read in by the receive logic of the terminal computer by way of the jumper cable 34 is the same that had been generated, it may be assumed that the receive logic is functioning correctly.

Including within this disclosure is an example of how the request to send flip flop in the Burroughs TC500 may be set and reset for specific periods of time in order to simulate the generation of a character.

Figure 6:
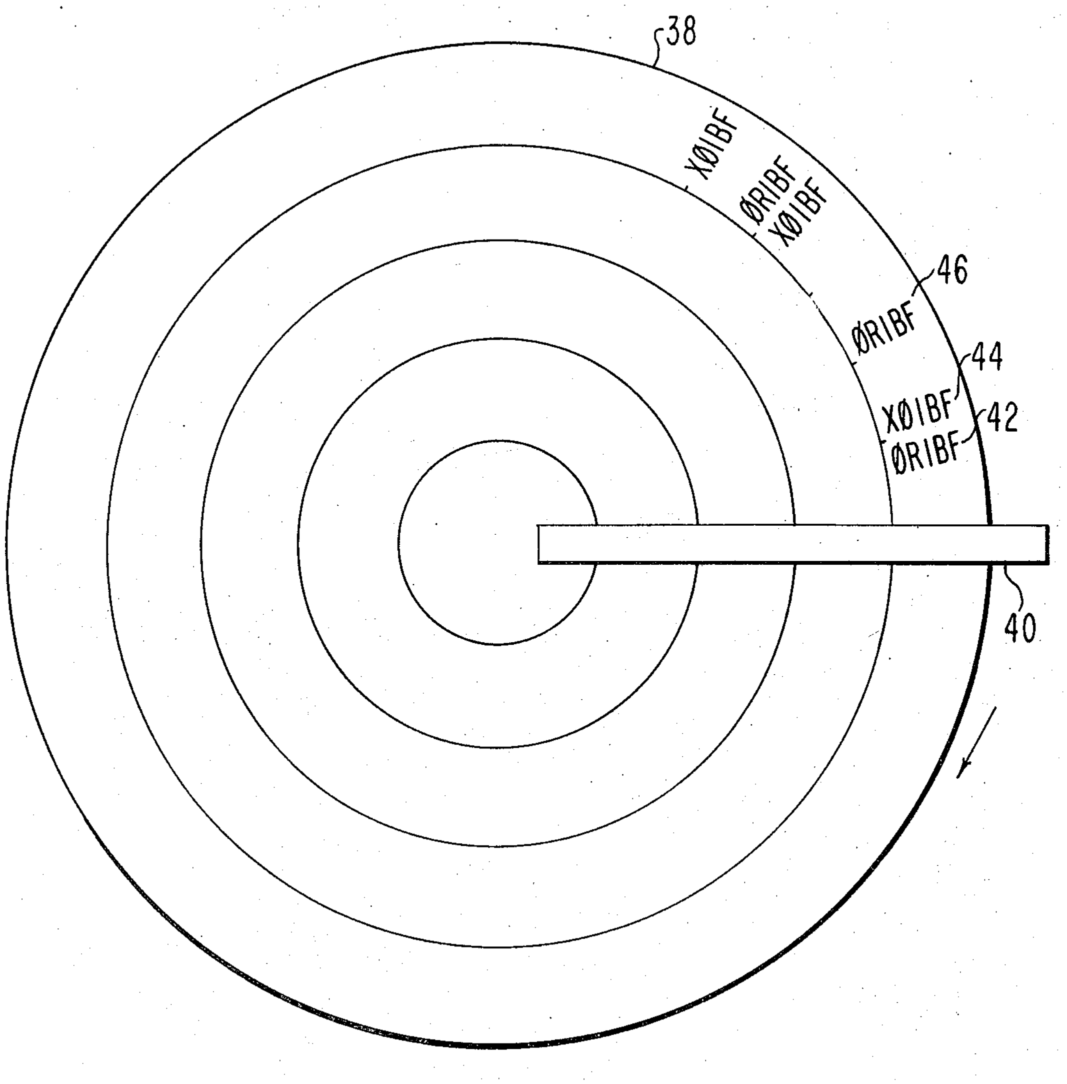
FIG. 6 is a diagram of the placement of micro code on a disk memory.

In the TC500 the voltage on the Request To Send Line, the REQSF line, is controlled by programmatically setting the EF6F flip flop. By governing the time in which the EF6F flip flop is set or reset, the voltage on the REQSF line may be controlled for specificed amounts of time. One of the ways in which the EF6F flip flop can be set is by placing the value of 4,0 in the B register and using the micro-instructions φR1BF and Xφ1BF. The Xφ1BF micro-instruction will set the EF6F flip flop and the Xφ1BF micro-instruction will reset the EF6F flip flop when the value of the B register is 4,0. The general technique of generating a signal on the Request To Send Line revolves around executing these two micro-instructions under specified timing conditions. Since the TC500 micro code resides on the magnetic disk 38 shown in FIG. 6, the timing of these instructions can be accomplished by placing the instructions in predetermined locations on the disk 38. The magnetic disk 38 of the TC500 revolves at a speed of 6,000 rpm or 10 ms per revolution and each track on the disk has its own fixed read-write head 40. An example of the relative placement of the micro-instructions to generate the character illustrated in FIG. 3 is shown in FIG. 6. First the φR1BF, micro-instruction 42 is placed on the disk so as to pass under the read-write head 40 first. This will set the Request To Send Line, thus simulating the start bit 36 of FIG. 5. Next the Xφ1BF micro-instruction 44 is placed on the disk 38 so as to pass under the read head 0.166 ms behind the previous micro-instruction 42. This will result in resetting the Request To Send Line to simulate a 1 bit. By the same token the next instruction on the disk would be the φR1BF micro-instruction 46 placed 0.366 ms behind the previous micro-instruction 44 wherein the 0.366 ms time delay will result in the generation of the first two bits as shown in FIG. 3. Thus it is readily apparent that any character may be simulated on the Request To Send Line by simply using the proper spacing of these two micro-instructions on the TC500 memory disk.

From the foregoing discussion it should be apparent that it is possible to test the data communications facilities of a large class of data communication computer terminals in a stand alone mode where the aforesaid terminals have input-output facilities that substantially perform the same functions as those described within this disclosure.

What is claimed is:

1. A method of testing a programmable data communication terminal wherein said method comprises the steps of:

generating on the data transmit line of said terminal a continuously repeating bit pattern, comparing the direct current voltage of said data transmit line carrying said bit pattern to the calculated average voltage for said bit pattern, applying a direct current voltage to the carrier detect line of said terminal so as to represent the detection of a carrier signal, connecting a request to send line of said terminal to a receive data line of said terminal, generating a bit pattern on said request to send line by programmatically setting and resetting said request to send line, and comparing said bit pattern generated on said request to send line with the bit pattern received in said terminal from said receive data line.

2. A method of testing the receive function of data communication terminals wherein said terminals interface with data communication networks by means of request to send lines, receive data lines and carrier detect lines, wherein said method comprises the steps of:

generating programmatically on said request to send line a signal representing a specified data character, simulating a carrier detect signal, connecting said request to send line with said receive data line, and comparing said character generated on said request to send line with the bit pattern received in said terminal over said receive data line.

3. The method as defined in claim 2 wherein said signal generated on said request to send line is generated by programming said terminal computer to apply positive and negative voltages to said request to send line for time periods as determined by the bit rate said terminal computer is set to receive.

4. The method of claim 2 wherein said carrier detect signal is simulated by applying a constant direct current voltage source to said carrier detect line.

5. A method of testing a digital computer with data communications facilities that interface with the data communications network by means of request to send lines, receive data lines, transmit data lines and carrier detect lines wherein said method comprises the steps of:

programming said computer to generate on said data transmit line a continuously repeating bit pattern, measuring the average direct current voltage of said data transmit lines by means of a direct current voltage measuring apparatus, comparing said measurement of said direct current voltage rating apparatus to the average value for said generated bit pattern, placing said computer in a receive mode, applying a carrier detect signal to said carrier detect line, generating programmatically on said request to send line a data character, and comparing said data character generated with the bit pattern received in said terminal over said receive data line.

6. In the method claimed in claim 5 wherein said signal on said transmit data line is biased by means of an amplifier thereby producing a signal of a single voltage polarity.

7. The method defined in claim 5 wherein said direct current voltage measuring device is comprised of a direct current voltage meter.

8. The method defined in claim 5 wherein said carrier detect signal is simulated by applying a direct current voltage source to said carrier detect line.

9 The method as defined in claim 5 wherein said data character is generated by programmatically applying voltages to said request to send line.

10. The method as defined in claim 9 wherein said application of said voltage to said request to send line is timed by the instruction execution rate of said computer to conform with the estimated bit rate for which said computer is set to receive.

11. A programmatic method of testing the receive logic of a programmable data communication terminal wherein said method comprises the steps of:

generating internally a predetermined bit pattern, placing said bit pattern on said terminals receive data line, simulating data reception mode for said terminal, and comparing said internally generated bit pattern with the bit pattern received over said receive data line.

* * * * *